United States Patent Office 2,942,029
Patented June 21, 1960

2,942,029
PATCHOULIONE

George Hermann Buchi, Cambridge, Mass., and Robert E. Erickson, Metuchen, N.J., assignors to The Givaudan Corporation, New York, N.Y., a corporation of New Jersey No Drawing. Filed Feb. 6, 1958, Ser. No. 713,551

1 Claim. (Cl. 260—587)

The present invention relates to a novel chemical substance, patchoulione, and to a process for preparing it.

Patchoulione may be represented by the following chemical structure:

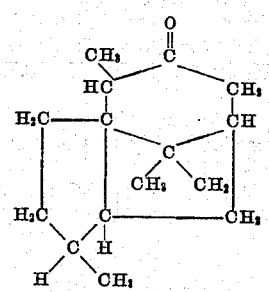

It is a novel ketone having a melting point of 47°–47.5° C. and has a powerful and striking ambergris note. This olfactory characteristic was unexpected in view of the structure of patchoulione and its patchouly alcohol origin. In appearance, patchoulione is a white, waxy crystalline solid. Its empirical formula is $C_{15}H_{24}O$; its 2,4-dinitrophenylhydrazone, $C_{21}H_{28}N_4O_4$, melts at 187.5°–188.5° C. and on equilibration in $D_2O$ patchoulione is converted to a trideuteroketone.

In general, the novel substance of this invention can be prepared by the ozonization of patchoulene. The patchoulene employed in accordance with this invention may be either (1) β-patchoulene or (2) a mixture of β- and γ-patchoulene, represented by the formulae:

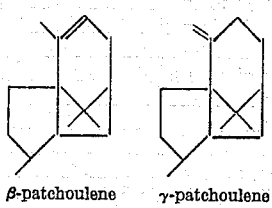

β-patchoulene   γ-patchoulene

Such mixture may be formed, for example, by dehydration of patchouly alcohol with acetic anhydride, phosphorous oxychloride or other phosphorous halides or other mineral halides in the presence of sodium acetate or any neutral or slightly basic salt or amines such as pyridine etc.

In order to illustrate the preparation of patchoulione, the following example is given. All melting points and boiling points are uncorrected. All infrared spectra, unless otherwise indicated, were measured on a Baird Associates recording spectrophotometer, Model B, with sodium chloride prism. All temperatures are given in ° C.

The pressure, temperature and concentrations employed in the preparation of patchoulione from patchoulene are not critical and may be varied widely.

EXAMPLE I

*Patchouly alcohol.*—Commercial oil of patchouli was obtained from Fritzsche Bros., Inc., New York, and distilled at 15–17 mm. through a short Vigreux column. The fraction (approximately 50–60% of the original oil) boiling at 160°–170° solidified on cooling and was recrystallized from n-pentane at −70° to yield pure patchouly alcohol, M.P. 55°–56°, pure or mixed with a sample of patchouly alcohol prepared in the laboratories of L. Ruzicka, Zurich, Switzerland. The infrared spectrum is identical with that of the authentic sample.

*Analysis.*—Calcd. for $C_{15}H_{26}O$: C, 81.02; H, 11.79. Found: C, 80.99; H, 11.65.

The compound gave no color reaction with tetranitromethane.

*Patchouly acetate.*—Ketene was prepared by the pyrolysis of acetone in an apparatus described by Hanford and Sauer in Organic Reactions, vol. III, 132 (1946).

Patchouly alcohol (30 g., 0.135 mole) was added to a solution of 1 ml. concentrated sulfuric acid in 300 ml. anhydrous ether (cooled to −5° under a calcium chloride drying tube) and allowed to react with ketene (approximately 0.22 mole) by bubbling in the reagent directly from the generator for 45 minutes. At the end of the reaction time the ether solution was poured into cold water. The ether layer was separated and washed with water, 5% sodium carbonate solution, water, and dried over anhydrous magnesium sulfate. Removal of the ether yielded 33.7 g. of a colorless oil.

The crude product was distilled through a semimicro column at 17 mm. and separation of material boiling up to 140° afforded a pale yellow oil (8.09 g. 26%) which was separated by redistillation, a rearranged isomer of patchoulene, B.P. 66.5°–67.5° (0.4 mm.), and β-, γ-patchoulene, B.P. 74°–75° (0.4 mm.), identified by their infrared spectra.

The pressure and the temperature in the column were then reduced and a second fraction (19.82 g., 56%) obtained, B.P. 102°–103° (0.2 mm.). Careful fractionation of a portion of the product by redistillation through the same column gave patchouly acetate, B.P. 101°–101.5° (0.2 mm.), $[n]_D^{25}$ 1.5010, $d_4^{20}$ 1.043, $[\alpha]_D^{30}$ +70.99°. The melting point was determined to be approximately 24°. The compound did not give any color reaction with tetranitromethane.

*Analysis.*—Calcd. for $C_{17}H_{28}O_2$: C, 77.22; H, 10.67. Found: C, 77.05; H, 10.64.

Infrared spectrum (pure liquid): 3.4–3.52, 5.83, 6.85, 7.35 (broad), 7.65, 7.80 (sh.), 8.0–8.2 (broad), 8.43, 8.62, 9.5, 9.7–10 (broad), 10.4, 10.7, 10.95, 11.04, 11.7, 12.2, 12.8, 13.4, 13.8, 14.5 microns.

In subsequent runs the following modifications were employed. Ketene was bubbled into 200 ml. anhydrous ether (protected by a calcium chloride drying tube) at −70° for 1 hour. A solution of patchouly alcohol (30.0 g., 0.135 mole) in 50 ml. dry ether was added followed by a solution of 1 ml. concentrated sulfuric acid in 50 ml. dry ether. Ketene was bubbled through for an additional 30 minutes and the reaction was worked up as above. Yields of 60–65% of patchouly acetate were obtained in this manner.

β-, γ-patchoulene (A) *Pyrolysis of patchouly acetate.*—Patchouly acetate (8.0 g., 0.03 mole), in a 25 mil. one-neck round-bottom flask with a 20 cm. Vigreux column leading to an ice-cooled receiver, was heated in a Wood's metal bath at 250°. Acetic acid was evolved slowly and collected in the receiver. The temperature was raised slowly to just maintain the evolution of acetic acid and keep the temperature of the vapors at the top of the Vigreux column below 120°. At a bath temperature of 320°, the product began to reflux and was maintained at this temperature for 30 minutes. The weight of the acetic acid was 1.3 g. (72%). After cooling to 27°, the product and distillate were combined and dissolved in ether. The ether solution was washed with water, dilute potassium hydroxide solution, water, and dried over anhydrous magnesium sulfate. Removal of the ether yielded 6.3 g. yellow oil which on distillation through a semimicro column at 17 mm. afforded one major fraction and about 1 g. of a none-distillable residue. Redistillation of the major fraction through the same column afforded β-, γ-patchoulene, B.P. 141°–142° (17 mm.), $[n]_D^{25}$ 1.5075, $d_4^{20}$ 0.9537, $[\alpha]_D^{30}$ —43.7°. The compound gave a yellow color with tetranitromethane.

*Analysis.*—Calcd. for $C_{15}H_{24}$: C, 88.16; H, 11.84. Found: C, 88.34; H, 11.82.

In another preparation, 5.0 g. of patchouly acetate yielded 3.62 g. (90%) of β-, γ-patchoulene, $[n]_D^{25}$ 1.5073, after distillation through a semimicro column.

(B) *Dehydration of patchouly alcohol.*—A mixture of patchouly alcohol (20.0 g., 0.09 mole), acetic anhydride (104 ml., 1.1 mole) and pyridine (30 ml.) was heated under reflux (protected by a drying tube) for 22 hours. The reaction mixture, after cooling to ice temperature, was slowly poured into a mixture of 100 g. sodium carbonate and 200 ml. of water. The reaction was cooled in an ice bath as necessary to moderate the evolution of carbon dioxide. After the hydrolysis of the excess acetic anhydride was essentially complete (ca. 1 hour), the organic material was extracted with two portions of ether, and the combined ether extracts were washed with water and dried over anhydrous magnesium sulfate. Removal of the ether and distillation of the residue through a 60 cm. modified Podbelniak column (J. Cason and H. Rapoport, "Laboratory Text in Organic Chemistry," Prentice-Hall, Inc., New York, New York, 1950, p. 237) gave 12.76 g. (70%) colorless oil, B.P. 129°–135° (17 mm. major portion at 134°–135°), infrared spectrum identical with that of β-, γ-patchoulene. A trace of pyridine was removed by filtering a petroleum ether solution of the hydrocarbon through 20 g. of alumina.

(C) Twenty-four (24) g. of patchouly alcohol dissolved in 400 ml. of pyridine was placed in a 1000 ml. round-bottom flask. To this solution 140 ml. of $POCl_3$ was added at once and the flask equipped with a reflux condenser protected with a drying tube. The reaction mixture was refluxed for 6 hours and then cooled to room temperature. By this time, the reaction mixture had turned to a dark purple color.

Crushed ice was placed in a 10 cm. glass column and the cooled reaction mixture was poured slowly through the column with more ice added as needed to prevent overheating.

The mixture was extracted twice with ether and the ether layer was washed with 10% HCl twice and then with water until neutral. The ether was dried over sodium carbonate overnight, filtered, and the ether removed on a steam bath. Distillation of the product through a Vigreux column gave 21.8 g. of β-, γ-patchoulene (91% yield), colorless liquid B.P. 53.5°–54.5°/0.14 mm., 141°–142°/17 mm., $[\alpha]_D^{25}$=—43.7°.

*Analysis.*—Calcd. for $C_{15}H_{24}$: C, 88.16; H, 11.84. Found: C, 88.34; H, 11.82.

*Patchoulione.*—A solution of β-, γ-patchoulene as hereinabove prepared (2.12 g., 0.01 mole) in 100 ml. ethyl acetate at —70° was allowed to react with ozone (the output of a Welsbach Ozonator, Model T19, oxygen input, delivering approximately 12 mg. ozone/minute) until the characteristic blue color of a saturated ozone solution developed in the reaction mixture (1–2 hours) and the spent gas stream liberated iodine from a saturated potassium iodide solution. The reaction mixture was concentrated in vacuo to ½ volume and hydrogenated at 27° and atmospheric pressure over 200 mg. of platinum oxide. After hydrogen uptake ceased (approximately 35% of the calculated amount for the reduction of a monozonide was taken up), the catalyst was removed by filtration and the ethyl acetate removed in vacuo. The resulting residue (2.09 g.) was dissolved in n-pentane and passed through a column containing 100 g. alumina. The column was then eluted with pentane containing increasing concentrations of ethyl acetate. Patchoulione (0.52 g., 23%) was eluted with 10% ethyl acetate-pentane. Recrystallization of the compound from the usual solvents was unsatisfactory because of its high solubility and the use of water-alcohol or water-acetone mixtures was also unsuccessful. Purification was carried out by recrystallization from methanol or petroleum ether at —70° in a modified Skau tube (N. D. Cheronis, "Micro and Semimicro Methods," Technique of Organic Chemistry, vol. VI, Interscience Publishers, Inc., New York, N.Y., 1954, pp. 33, 48) centrifugation of the mother liquors away from the crystals before dissolution could occur, and sublimation. The pure compound had M.P. 47°–47.5°.

*Analysis.*—Calcd. for $C_{15}H_{24}O$: C, 81.76; H, 10.98. Calcd. for $C_{14}H_{22}O$: C, 81.50; H, 10.75. Found: C, 81.34, 81.44; H, 10.85, 10.91.

Reaction of the ketone with 2,4-dinitrophenylhydrazine reagent preceded slowly to yield an orange derivative, M.P. 187.5°–188.5°.

*Analysis.*—Calcd. for $C_{20}H_{26}N_4O_4$: C, 62.16; H, 6.75. Calcd. for $C_{21}H_{28}N_4O_4$: C, 62.98; H, 7.05. Found: C, 62.62, 62.78, 62.92; H, 7.11, 7.08, 7.14.

The following examples illustrate the manner in which the novel compound of this invention, as described and prepared herein, may be employed.

EXAMPLE II

A typical amber composition was made as an example of a perfume that depends upon the fixing and sweetening effect of ambergris for its perfection. The formula of the base without any ambergris is as follows; the parts being by weight:

*Amber base*

| | |
|---|---|
| Musk ketone | 125.0 |
| Vanillin USP | 37.5 |
| Coumarin | 12.5 |
| Musk ambrette | 12.5 |
| Phenylacetic acid | 6.25 |
| Labdanum, soluble resin | 37.5 |
| Benzoin Siam, soluble resin | 75.0 |
| Benzyl acetate | 62.5 |
| Citronellol from citronella oil | 25.0 |
| Benzyl benzoate | 250.0 |
| Amyl salicylate | 250.0 |
| Cedarwood oil | 37.5 |
| Phenylethyl alcohol | 6.25 |
| Thyme white oil 10% in diethyl phthalate | 12.5 |
| Castoreum substitute synthetic E | 50.0 |
| | 1,000.00 |

The odor of this composition has a typical amber character but lacks all the richness and sweetness that is desired in such a perfume. Two portions of this amber base were taken and the addition of patchoulione to one and of ambergris to the other was made as follows:

| | A | B |
|---|---|---|
| Amber base | 1.5 | 1.5 |
| Ambergris tinct. approx. 5% | 0.01 | |
| Patchoulione 5% in ethyl alcohol | | 0.01 |
| | 1.51 | 1.51 |

Samples of mixtures A and B and of amber base were taken on smelling blotters and studied organoleptically, freshly applied and during five days of drying. It was observed that both mixtures A and B benefited greatly by their augmentations, mixture B having even more richness of odor than mixture A. It was also observed that after 3 days of drying the odor of the amber base, itself composed largely of persistent materials, became flat and devoid of sweetness. Both mixture A and B maintained sweet and fragrant odors for more than five days.

EXAMPLE III

A version of the popular moss type perfumes was formulated as follows; the parts all being by weight:

*Moss base*

| | |
|---|---:|
| Linalyl acetate | 11.60 |
| Dihydroterpinyl acetate | 5.80 |
| Jasmin blanc extra | 21.50 |
| Oak moss soluble resin | 7.00 |
| Citronellol extra | 5.80 |
| Anhydrol labdanum | 5.80 |
| Aldehyde C-11 10% in diethyl phthalate | 2.33 |
| Aldehyde C-10 10% in diethyl phthalate | 2.92 |
| β-Naphthol methyl ether | 1.16 |
| Coumarin | 1.75 |
| Musk ketone | 4.65 |
| Vanillin USP | 1.16 |
| Benzoin soluble resin | 3.50 |
| Eugenol extra | 4.65 |
| α-Isomethylionone | 7.55 |
| Lilial | 3.50 |
| Styralyl acetate | 0.58 |
| Cedar ketone | 1.16 |
| Amyl benzoate | 2.33 |
| Olibanum oil 10% in diethyl phthalate | 0.60 |
| Bergamot oil 10% in diethyl phthlate | 2.33 |
| Orris substitute synthetic E 10% in diethyl phthalate | 2.33 |
| | 100.00 |

Two portions of this moss base were taken and the addition of patchoulione to one and of ambergris to the other was made as follows:

| | C | D |
|---|---:|---:|
| Moss base | 2.0 | 2.0 |
| Ambergris tinct. 5% | 0.01 | |
| Patchoulione 5% in ethyl alcohol | | 0.01 |
| | 2.01 | 2.01 |

Finished perfumes were made from mixtures C and D and from Moss base by adding 0.6 gm. of the oil to 4.4 gms. of ethyl alcohol. Samples of these perfumes were taken on smelling blotters and studied organoleptically.

Both perfumes C and D exhibited a smooth but sparkling lift which is a mark of elegance that ambergris is esteemed for imparting. Moss base perfume, although sweet and pleasant smelling lacked this final touch of perfection.

The foregoing illustrates the practice of this invention which, however, is not to be limited thereby, but is to be construed as broadly as permissible in view of the prior art and limited solely by the appended claim.

What is claimed is:

The product, patchoulione, having the formula:

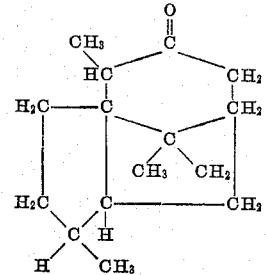

References Cited in the file of this patent

Treibs: Annalen der Chemie, vol. 564, pp. 141–51 (1949).

UNITED STATES PATENT OFFICE
CERTIFICATE OF CORRECTION

Patent No. 2,942,029                          June 21, 1960

George Hermann Buchi et al.

It is hereby certified that error appears in the printed specification of the above numbered patent requiring correction and that the said Letters Patent should read as corrected below.

Column 1, lines 20 to 31, and column 6, lines 27 to 38, the formula in each occurrence should appear as shown below instead of as in the patent:

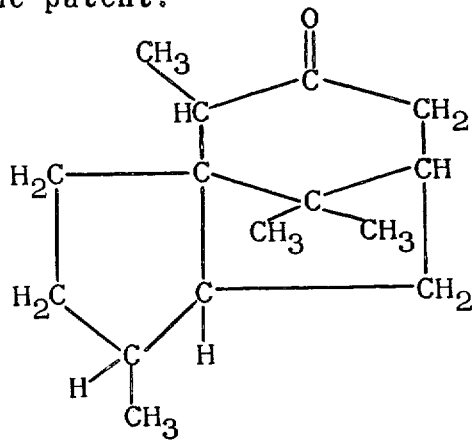

Signed and sealed this 18th day of April 1961.

(SEAL)
Attest:

ERNEST W. SWIDER                                DAVID L. LADD
Attesting Officer                                    Commissioner of Patents